United States Patent [19]
Guilbault et al.

[11] Patent Number: 5,184,472
[45] Date of Patent: Feb. 9, 1993

[54] ADD ON HEAT PUMP SWIMMING POOL HEATER CONTROL

[76] Inventors: Pierre Guilbault, 1781 Carolyn, St. Bruno, Quebec, Canada, J3V 2W1; Pierre Pilon, 61-A 3rd Ave Nord, Boisbriand, Quebec, Canada, J7G 1E4

[21] Appl. No.: 787,598

[22] Filed: Nov. 4, 1991

Related U.S. Application Data

[63] Continuation-in-part of Ser. No. 638,763, Jan. 8, 1991, abandoned.

[51] Int. Cl.⁵ ............................................. F25B 13/00
[52] U.S. Cl. ...................................... 62/160; 62/180; 62/201; 62/183; 62/238.7
[58] Field of Search ................ 62/238.6, 238.7, 324.1, 62/201, 202, 160, 178, 180, 181, 183, 184

[56] References Cited
U.S. PATENT DOCUMENTS

3,188,829 6/1965 Siewert et al. ..................... 62/160
3,926,008 12/1975 Webber ............................. 62/238.6

*Primary Examiner*—John Sollecito
*Attorney, Agent, or Firm*—Robic

[57] ABSTRACT

A pool heater to be installed on a commercially available residential heat pump in order to add swimming pool heating to the basic functions of the heat pump, i.e. heating and cooling of a dwelling. This "add-on a heat pump" pool heater comprises a refrigerant-to-water heat exchanger with a water flow control and associated piping, a water temperature control, a flow detecting device and a specialized control logic which is integrated to the heat pump control. The heat exchanger is connected on the refrigerant side to the outlet of the compressor of the heat pump circuit and to the inlet of the reversing valve. On the water side, the heat exchange is connected on a diversion loop of the pool water filtration system to allow water to be heated by the refrigerant exiting the compressor. The integrated control conserves all the basic modes of the heat pump, i.e. heating, cooling and defrosting, and all the protective functions; it also adds heating of the swimming pool if there is no heating or cooling demand from the dwelling, and permits simultaneous heating of the swimming pool and cooling of the dwelling.

3 Claims, 4 Drawing Sheets

FIG. 4

| | DEMAND SIGNAL | COOLING SIGNAL | WATER FLOW SIGNAL | WATER THERMOSTAT SIGNAL | REVERSING VALVE IN OPERATION | INDOOR FAN IN OPERATION | OUTDOOR FAN IN OPERATION |
|---|---|---|---|---|---|---|---|
| (a) HOUSE HEATING | YES | NO | YES/NO | YES/NO | NO | YES | YES |
| (b) AIR CONDITIONING OF HOUSE | YES | YES | YES/NO | NO | YES | YES | YES |
| (c) AIR CONDITIONING OF HOUSE AND POOL HEATING | YES | YES | YES | YES | YES | YES | NO |
| (d) AIR CONDITIONING OF HOUSE WITH POOL PUMP SHUT-DOWN OR POOL FILTER BACKWASH | YES | YES | NO | YES | YES | YES | YES |
| (e) POOL HEATING | NO | YES/NO | YES | YES | NO | NO | YES |
| (f) DEFROST | YES | NO | YES/NO | YES/NO | YES | YES | NO |

ADD ON HEAT PUMP SWIMMING POOL HEATER CONTROL

CROSS-REFERENCE

This application is a continuation-in-part of application Ser. No. 07/638,763 filed on Jan. 8, 1991, now abandoned.

BACKGROUND OF THE INVENTION a) Field of the Invention

The present invention is concerned with a very simple yet efficient device that can be added to most of the commercially available residential air source heat pumps used to heat or cool a dwelling, a house or any similar building, in order to make it possible for such a heat pump to be used as a water heater for a swimming pool located nearby or inside the dwelling, house or building, without the heat pump loosing any of its primary function, i.e. heating and cooling of the dwelling, house or building.

b) Brief Description of the Prior Art

Swimming pool heating has been traditionally done by means of water heaters taking their energy from fossil fuels, electricity or solar panels.

Recently, it has been proposed to use heat pumps instead of gas, oil, electric or solar systems, in order to heat swimming pools. Heat pumps are well known devices which, in this particular application, use their refrigerant circuit to "pump" ambiant heat through an evaporator and transfer it to the swimming pool water through a condenser in which the water is circulated. An example of such a system making use of a heat pump to heat an indoor swimming pool while simultaneously dehumidifying the ambient air passing through the evaporator is disclosed in Canadian patent No. 1,221,838.

It has also been proposed to use refrigerating apparatus to heat pools or domestic water. Thus, by way of example, U.S. Pat. No. 3,976,123 discloses an air conditioning system including a heat exchanger in which the rejected energy is used to heat a swimming pool. Although the heat exchanger could be implemented as an add-on device, its positioning after the outdoor coil is such that even if the exterior fan is stopped, the system will be less efficient than if it would have been installed immediately after the compressor, as is proposed in accordance with the present invention.

It is also recognised that air conditioning cannot provide sufficient heat at the beginning and at the end of the pool heating season. As a result, supplemental heat from a heater or the house furnace is necessary when use is made of such a system. Furthermore, the system disclosed in this patent does not make use of a pressure regulated flow valve, or any other type of circuits to maintain the compressor head pressure when pool water is cold such that proper refrigeration cycle is insured, resulting in poor system performance and possible freezing of interior heat pump heat exchanger. In addition the system disclosed in this patent does not make use of a water flow sensing device. As a result, if the filter pump is stopped or if the filter is operated in backwash mode, this leads to high pressure at the compressor outlet and causes the system to stop.

U.S. Pat. No. 3,188,829 discloses a heat pump with a heat exchanger located between its compressor and its reversing valve to heat domestic hot water. The system disclosed in this patent has very specific control system which as substantially different from what is proposed in accordance with the present invention. In this U.S. Pat. No. 3,188,829, a bypass extands from the outlet of the compressor to the receiver with a check valve and a control valve. This circuit is of prime importance to the system since it maintains a predetermined minimum system pressure at the refrigerant storage means. However, it is structurally complicated and costly to implement as an "add-on a heat pump", because no commercially available heat pump is equipped with such a by-pass. Also in this patent, the control system does not stop the operation of the outside fan during cooling, reducing the amount of energy rejected to the pool. Furthermore, the control system does not permit to initiate heat pump operation if pool heating is required and if the heat pump is on stand-by. This feature would require that the inside fan be prevented from operating.

Finally in U.S. Pat. No. 3,188,829, a water by-pass and a diverting valve is provided to prevent circulation of water in the heat exchanger, in the defrosting mode. This is again different from what is proposed in accordance with the present invention, where a pressure regulated water flow valve is used, which automatically closes the water circuit if the heat pump is in the defrosting mode.

It has also been proposed so far to use swimming pools as heat sources from which heat can be extracted by a heat pump to heat buildings. Examples of such a system where the swimming pool water is circulated through the heat pump evaporator, are disclosed in French laid-open patent application Nos. 2,428,783 and 2,564,953.

SUMMARY OF THE INVENTION

From a knowledge of the distribution of the operating hours of a heat pump over a given period, and of the heating demand for a swimming pool over the same period, Applicants have found and calculated that a heat pump of a conventional type already used to heat and cool a dwelling may also be used to heat adequately a swimming pool located nearby or even inside this dwelling, as both loads are non concordant, i.e. is not in simultaneous use.

Based on these findings and calculations, the present invention provides an add on a heat pump pool heater including a heat exchanger that can be installed in a very simple yet efficient manner on a conventional heat pump designed to heat and cool a home, in order to add swimming pool heating to the basic functions of this heat pump.

With such an add-on a heat pump pool heater incorporated into a conventional heat pump, it becomes possible to heat the dwelling exclusively, to cool the same exclusively, to cool the dwelling and simultaneously heat the pool and to heat the swimming pool exclusively. The heat pump incorporating such an add-on a heat pump pool heater can still be put in defrosting mode and keeps its protective functions.

Contrarily to all the pool heating systems known to the Applicants, the add-on a heat pump pool heater according to the invention can be installed at low cost on all brands and all sizes of heat pumps available on the market to provide the required pool heating in the most efficient way, without need for a supplementary heating system. The pool heater according to the invention also permits additional operating cost savings as compared to the convention heat pump swimming pool heater, since it makes use of the heat extracted from the dwelling when the same is being cooled, to heat the pool at no cost. Moreover, the investment cost to buy and install the device is less than any conventional gas, oil or solar pool heaters or known swimming pool heat pumps.

More particularly, the present invention as broadly claimed hereinafter, is concerned with an improvement to a heat pump for use to heat and cool a dwelling, said heat pump comprising a refrigerant circuit including, in the following order, a compressor having a refrigerant inlet and a refrigerant outlet, a reversing valve, an outdoor heat exchanger, an expansion device, an indoor heat exchanger. The improvement consists in the incorporation into the refrigerant circuit, of an add-on heat exchanger for use to heat water from a swimming pool that is located nearby or inside the dwelling and is provided with a water filtration system including at least one filter through which water from the swimming pool is circulated by a pump. The add-on heat exchanger is part of the refrigerant circuit and is connected thereto in series between the outlet of the compressor and the reversing valve. The add-on heat exchanger is also part of the water filtration system and connected thereto in order to allow heat exchange between the refrigerant circulating through the refrigerant circuit and the water circulating through the water filtration system and thereby heating of the water by the refrigerant leaving the compressor.

The add-on heat exchanger used in accordance with the invention must of course be properly sized to be "compatible" with both the refrigerant circuit and the water pool filtration system. It must also be designed to operate with chlorinated water.

In accordance with a very important aspect of the invention, the add-on heat exchanger is mounted in a diversion loop of the water filtration system and this diversion loop includes a water flow sensor preferably consisting of a pressure switch, a water flow regulating device preferably made up of a pressure activated water regulating flow valve responsive to the refrigerant pressure at the outlet of the compressor, and a water temperature sensor.

In accordance with another very important aspect of the invention, a supplemental control device is provided, which is operatively connected to the sensors and integrated to the basic control device of the heat pump to fully integrate the pool heating function to all the other functions of the heat pump.

The invention, its operation and its advantages will be better understood upon reading the following non-restrictive description of a preferred embodiment thereof, given with reference to the accompanying drawings.

BRIEF DESCRIPTION OF THE DRAWINGS

FIG. 4 is a logic diagram of the control device shown in FIG. 2.

DESCRIPTION OF A PREFERRED EMBODIMENT

Figure 1:
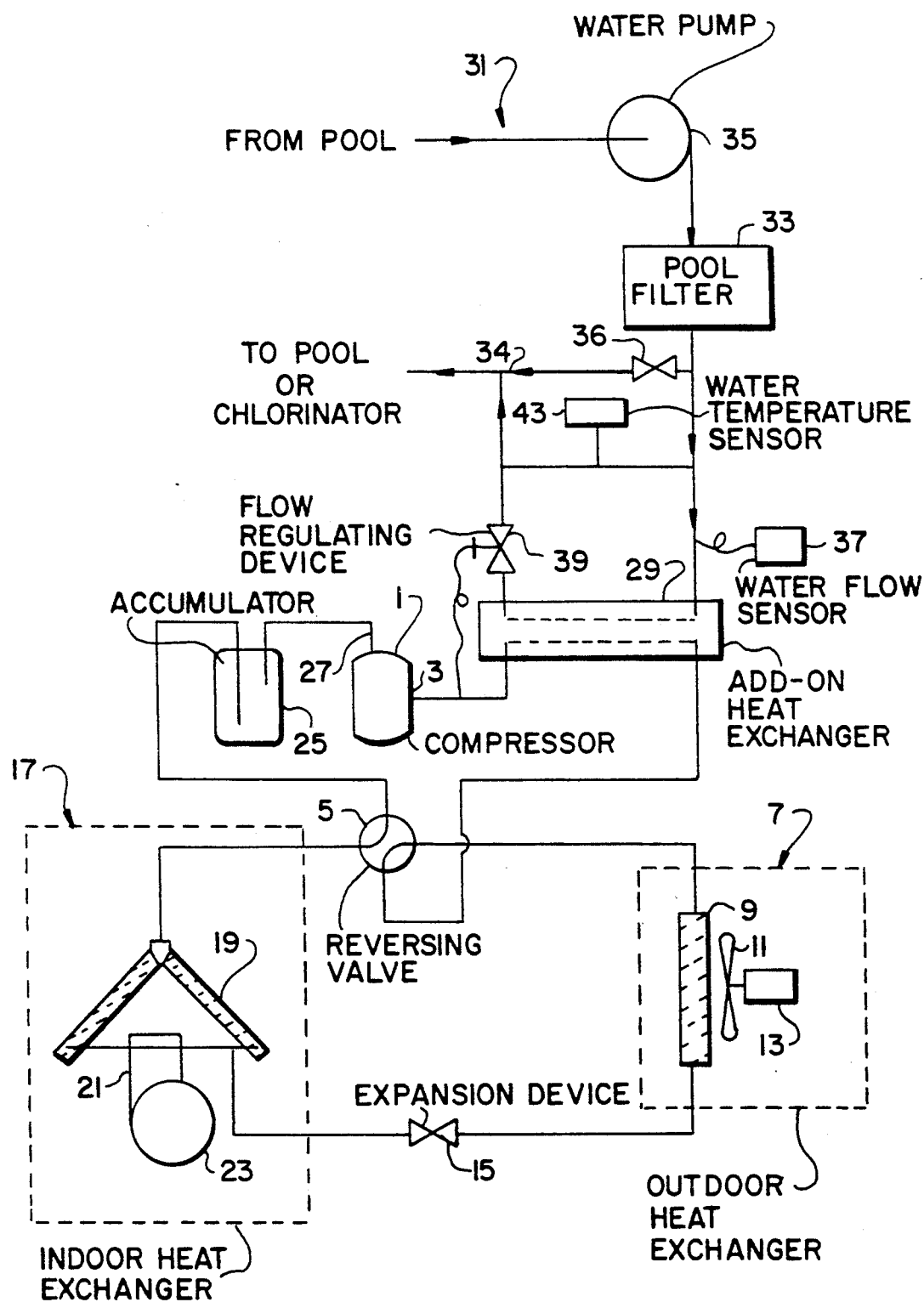
FIG. 1 is a schematic representation of a heat pump with the add-on a heat pump swimming pool heater according to the invention.

The heat pump to which is incorporated the add-on a heat pump swimming pool heater according to the invention is shown in FIG. 1 and can be of any conventional structure presently available in the market. It comprises all the structural elements of a conventional heat pump for use to heat or cool a dwelling in response to demand and cool demand signals from a thermostat located inside the dwelling.

In the present specification as well as in the appended claims, the word "dwelling" must be understood as including any kind of house, building and similar construction.

More particularly, the heat pump shown in FIG. 1 comprises a refrigerant circuit including, in the following order a compressor 1 having a refrigerant outlet 3; a reversing valve 5; an outdoor heat exchanger 7 including an outdoor coil 9 and a fan 11 operated by an electric motor 13 to blow air through the coil 9; an expansion device 15; an indoor heat exchanger 17 including an indoor coil 19 and a fan 21 operated by an electric motor 23 to blow air through the coil 19; again the reversing valve 5; and a refrigerant accumulator 25 connected to the inlet 27 of the compressor 1.

As aforesaid, this basic structure is well known in the art and can be found in any heat pump presently available on the market for use to heat or cool a dwelling.

When the reversing valve 5 is in the position shown in FIG. 1, the heat pump is in the cooling mode. The hot refrigerant leaving the compressor 3 passes first through the coil 9 of the outdoor heat exchanger where it is cooled down by the ambiant air blown by the fan 11. Then, it is further cooled down by passing through the expansion device 15 before reaching the indoor heat exchanger 17 where it is used to cool and dehumidify the air blown by the fan 21. The refrigerant leaving the coil 19 is returned to the accumulator 25 via the valve 5 before being recirculated by the compressor 1.

When the reversing valve is switched to its other position, the heat pump is in the heating mode.

Then, the hot refrigerant leaving the compressor 3 passes first into the indoor heat exchanger where it is used to heat air blown by the fan 21, before passing through the expansion device 15 and the outdoor heat exchanger 7, where it absorbs the outside heat, and is returned to the accumulator 25 and compressor 3.

Figure 2:
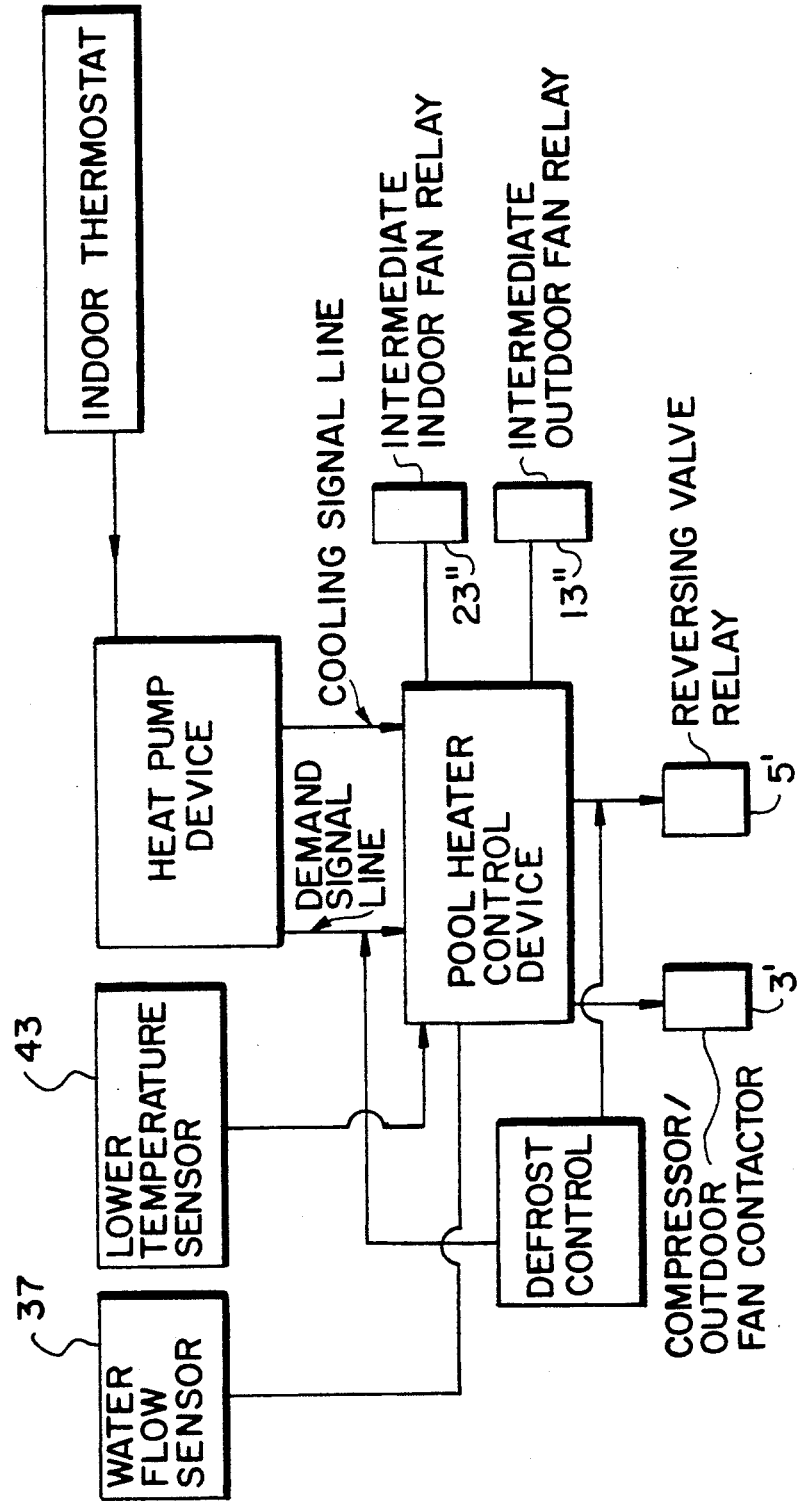
FIG. 2 is a block diagram of the control device of the heat pump shown in FIG. 1.
Figure 3:
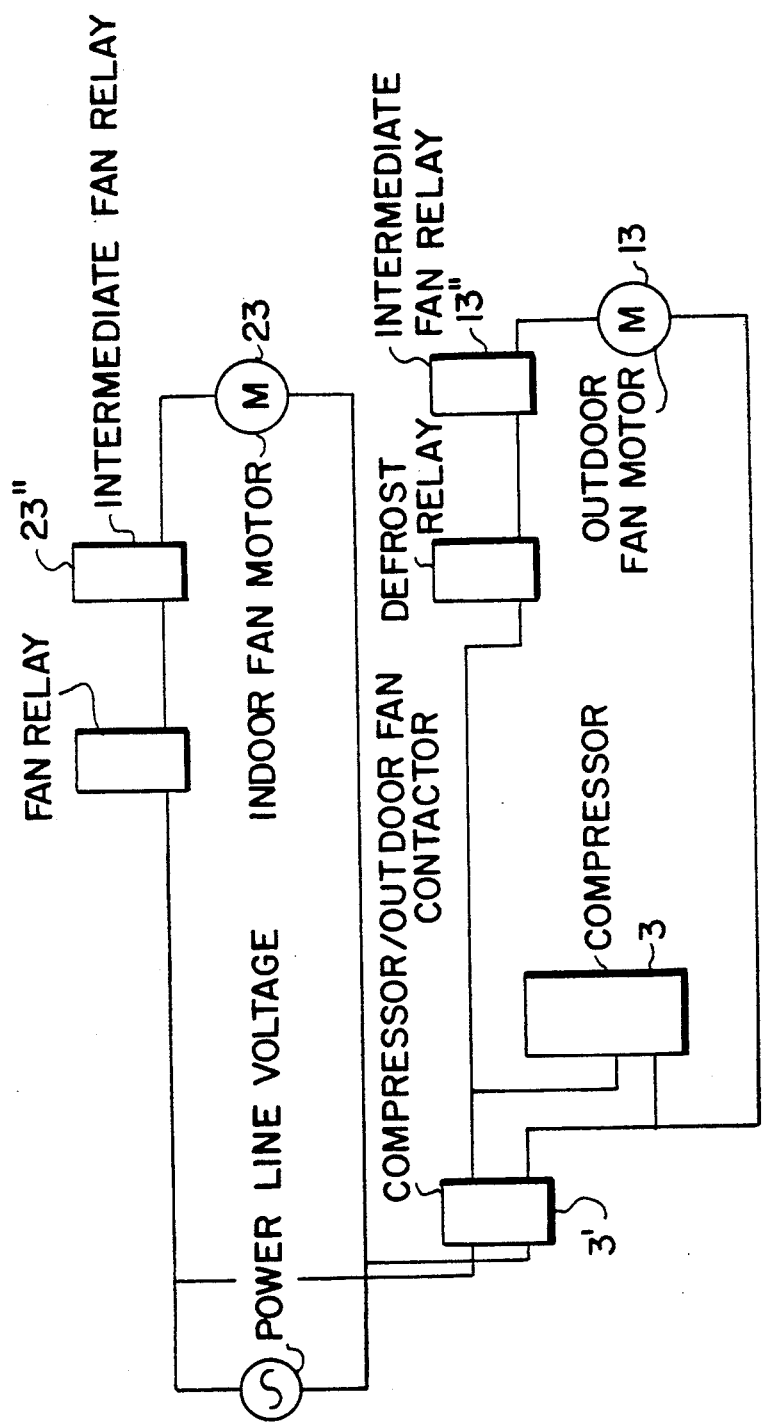
FIG. 3 is a block diagram of the electric circuiting of the heat pump shown in FIG. 1.

The operation of the heat pump in both of these modes is controlled by a control device as shown in the diagrams of FIGS. 2 and 3, which is connected to an indoor thermostat that produces demand and cooling signals. These two signals control the actuation of the compressor 3 and of the motor 13 of the fan of the outdoor heat exchanger 7 via a compressor/fan contactor 3', and the reversal of the reversing valve 5 via a reversing valve relay 5'.

As aforesaid, this heat pump structure and the way its works and is controlled are well known and no invention is claimed therefor.

Returning to FIG. 1, the invention lies in the incorporation of a refrigerant-to-water heat exchanger 29 in the refrigerant circuit. In accordance with the invention, the heat exchanger 29 is connected in series in the refrigerant circuit between the outlet 3 of the compressor 1 and the reversing valve 5. This exchanger 29 is intended to be used as a full "condenser" to heat water from a swimming pool which his located nearby or even inside the dwelling and which comprises, as most of the swimming pools, of a water filtration system 31 including at least one filter 33 through which water from the pool is circulated by a pump 35.

As shown in FIG. 1, the heat exchanger 29 is also part of the water filtration system 31 and connected in parallel to the water return pipe 34 of this system, downstream the filter 33, in order to allow heat exchange between the refrigerant circulating through the refrigerant circuit and the water circulating through the system 31, thereby heating of the water by the hot refrigerant leaving the compressor 1. A manual valve 36 is provided in the pipe 34 to adjust the amount of water to be diverted through the heat exchanger 29.

As also shown in FIG. 1, the water flowing through the derivation up to the inlet of the heat exchanger 29 passes by a flow sensor 37 that may consist of a pressure switch located upstream the heat exchanger 29 and through a water flow regulating device 39, preferably consisting of a pressure-activated water regulating flow valve that is responsive to the pressure of the refrigerant at the outlet of the compressor 3 and is located downstream the heat exchanger 29 before returning back to the pool. A bypass 41 where a limited amount of water may always circulate even when the flow regulating device 39 is closed, is provided between the water inlet and outlet of the add-on heat exchanger 29. This bypass 41 incorporates a water temperature sensor 43 which is located there so as to ensure proper measurement of the swimming pool water temperature in a permanent manner, even when the flow regulating device 39 is closed. It is worth mentioning that the water temperature sensor 41 could be positioned at other places such as at the inlet of the derivation downstream the filter 33, provided however that water is always free to circulate.

In order to understand the control logic of the system according to the invention, it is worth reminding that most of the existing heat pumps operate their controls via a secondary 24 Volts circuit, and make use of two signals which are a demand signal which operates the compressor and outdoor fan contactor and a cooling signal witch operates the reversing valve relay. As aforesaid these signals are made operative by the indoor thermostat.

In accordance with the invention, these two signals are intercepted between the heat pump control device compressor/outdoor fan contactor 3' and the reversing valve relay 5' respectively, and supplied to a pool heater control device whose purpose is to control the heat pump with the swimming pool water heater.

As shown in FIG. 2, signals from the water flow sensor 37 and water temperature sensor or thermostat 43 are also fed to the pool heater control device. These signals are processed in a manner known per se to control the compressor and exterior fan contactor, the reversing valve relay and additional indoor fan relay 23" and an additional outdoor fan relay 13".

The pressure activated water flow regulating valve 39 plays an important role in the proper control of the refrigerant circuit in the different control modes. Its pressure is adjusted to a level depending of each particular heat pump so that proper operation of the system is assured in all modes. This adjustment will normally vary from 225 psig to 300 psig. Although actuated only by the compressor outlet pressure, its operation will be explained simultaneously with the operation of the pool heater control device.

(a) When a demand signal is received by the pool heater control device from the heat pump control device, but no cooling signal is received, i.e. when a house heating demand is detected, the pool heater control device sends signals to activate the compressor outer-fan contactor 3' and the indoor and outdoor fan motors via the intermediate relays 3" and 13". The heat pump is in its normal heating mode. Signals from water thermostat 43 and from water flow sensor 37 may or may not be present.

Depending on the outside temperature, the compressor outlet pressure will be in most case below the preset pressure level of the pressure activated water regulating flow valve 39. As a result, no water will circulate through the add-on heat exchanger, therefore insuring proper house heating.

(b) When a demand signal and a cooling signal are received from the heat pump control device and no signal is received from the pool water thermostat 43, i.e. when a house cooling demand only is detected, the pool heater control device sends signals to switch on the compressor outdoor-fan contactor 3', the reversing valve relay 5', and the relays to activate the intermediate indoor and outdoor compressor and fan motors. The heat pump is in its normal cooling mode. Depending on the outside temperature, the compressor outlet pressure will be in most cases below the preset pressure level of pressure activated water regulating flow valve 39. As a result no water will circulate through the add-on heat exchanger, and no pool heating will be achieved. Under certain circumstances, it may happen that the compressor pressure rise above the preset pressure level. In this case, the heat will be rejected partly into the pool water, but mostly in the air through the heat pump outdoor heat exchanger.

(c) When a demand signal and a cooling signal are received from the heat pump control device, and signals are also received from the water flow sensor 37 and pool water thermostat 43, i.e. when a house cooling demand is detected and pool heating is required, the pool heater control device sends signals to switch on the compressor and outdoor fan contactor 3' in order to activate the compressor, to switch on the reversing valve relay 5' and to switch on the indoor fan motor or via the intermediate fan relay 23'. A signal is also sent to the intermediate fan relay 13' to switch off the outdoor fan. The outdoor fan being inoperative, the compressor outlet pressure rises and open the water flow valve 39. As a result, heat is rejected to the pool water.

(d) When a demand signal and a cooling signal are received from the heat pump control device and a signal is received from the pool water thermostat 43, but no signal is received from the water flow sensor 32, the pool heater control sends signals to switch on the compressor and outdoor fan contactor 3', the reversing valve relay 5' and the intermediate indoor and outdoor fan relays to activate the compressor and the indoor and outdoor fan motors. The heat pump is left in its normal cooling mode. This condition may occur in the event of a pool pump shut-down, or in case of a pool filter backwash.

(e) When no demand signal is received, but signals are received from the water thermostat 43 and flow sensor 37, the pool heater control device sends signals to switch on the compressor and outdoor fan contactor 3' to activate both the compressor and outdoor fan motor. However, a signal is also sent to the intermediate indoor fan relay to prevent operation of the indoor fan. The cooling signal may or may not be present. The heat pump is therefore switched in its heating mode, but since the indoor fan is inoperative, all the heat is rejected to the pool.

(f) In case of a defrost, a signal is sent by the defrost control (see FIG. 2) to the pool heater control device to simulate a demand signal. In addition the reversing valve is activated, and the outdoor fan is made inoperative by the defrost control. The pool heater control device receives a demand signal but no cooling signal such that it "sees" a heating demand from the house. It switches on the compressor and outdoor fan contactor 3+ and permits the indoor fan to operate via its intermediate relay. Thus, the heat pump is put in this cooling mode while the outdoor fan motor is made inoperative by the defrost control.

Since this sequence will happen only during cold weather, preferably when there is ice formation on the heat pump outdoor heat exchanger, the compressor outlet pressure will fall below the preset pressure level of the pressure activated water regulating valve, such that no water will circulate through the add-on heat exchanger. As a result, all the heat will be available for defrosting the outdoor heat exchanger.

Advantageously, a switch may be mounted in such a way that the pool heater control device is completely by-passed, and the heat pump control device regains full control of the system. This switch is particularly convenient for diagnostic purposes.

Another switch (not shown) may also be provided on the pool heater control to override the water thermostat 43 when the heat pump operates in the cooling mode, in order to continue heating the water of the swimming pool even though the temperature of the water is sufficient to satisfy the water thermostat 43. This permits to use all the "free" heat available when the heat pump is in the cooling mode.

What is claimed is:

1. In a heat pump for use to heat and cool a dwelling, said heat pump comprising a refrigerant circuit including, in the following order, a compressor having a refrigerant inlet and a refrigerant outlet, a reversing valve, an outdoor heat exchanger with an outdoor fan, an expansion device, an indoor heat exchanger with an indoor fan, and, again, said reversing valve, said heat pump also comprising a heat pump control device generating a demand signal, a cooling signal or both as a function of signals received from an indoor thermostat, said demand signal controlling actuation of the compressor and of the indoor and outdoor fans, said cooling signal causing reversal of said reversing valve, the improvement wherein:

said refrigerant circuit further includes an add-on heat exchanger for use to heat water from a pool that is located nearby or inside said dwelling and is provided with a water filtration system including at least one filter through which said water from said pool is circulated by a pump, said add-on heat exchanger is part of said refrigerant circuit and is connected thereto in series between the outlet of the compressor and the reversing valve, said add-on heat exchanger is also part of said water filtration system and is mounted in diversion loop thereof downstream the water filter, to allow heat exchange between the refrigerant circulating through said refrigerant circuit and said water circulating through said water filtration system and thereby heating of said water by said refrigerant leaving the compressor, said diversion loop includes a pressure-activated water flow regulating device, responsive to the pressure of the refrigerant at the outlet of the compressor, said diversion loop also including a water flow sensor and a water temperature sensor that are operatively connected to a pool heater control device, said pool heater control device receiving said demand and cooling signals wherever present from said heat pump control device together with a water flow signal from said water flow sensor and a water temperature signal from said water temperature sensor and being operatively connected to means for controlling said indoor and outdoor fans respectively, in such a manner that:

(a) when the pool heater control device receives a demand signal but no cooling signal, whatever be the water flow and water temperature signals, the compressor and the indoor and outdoor fans are activated, whereby the heat pump is operating to heat the dwelling;

(b) when the pool heater control device receives a demand signal, a cooling signal but no water temperature signal whatever be the water flow signal, the compressor and the indoor and outdoor fans are activated and the reversing valve is reversed, whereby the heat pump is operating to cool the dwelling;

(c) when the pool heater control device receives a demand signal, a cooling signal, a water flow signal and a water temperature signal, the compressor and indoor fan are activated, the reversing valve is reversed and the outdoor fan is switched off by said outdoor fan controlling means, whereby the heat pump is operating to cool the dwelling and simultaneously heat the swimming pool water;

(d) when the pool heater control device receives a demand signal, a cooling signal, a water temperature signal but no water flow signal, as may occur in the cases of a pool shut-down or of a pool filter backwash, the compressor and the indoor and outdoor fans are activated and the reversing valve is reversed, whereby the heat pump is operating to cool the dwelling; and (e) when the pool heater control device receives a water flow signal, a water temperature signal but no demand signal whatever be the cooling signal the compressor and outdoor fan are activated and the indoor fan is switched off by said indoor fan controlling means, whereby the heat pump is operating to heat the swimming pool water exclusively.

2. The improved heat pump of claim 1, further comprising a defrost control device to simulate a demand signal whenever the outdoor heat exchanger is to be defrosted and thus to activate the compressor and indoor fan, to switch off the outdoor fan and to reverse the indoor fan.

3. The improved heat pump of claim 2, further comprising a switch to override the water temperature sensor and cause the heat pump to operate in the cooling mode and continue heating the water of the swimming pool even though the temperature of said water is sufficient to satisfy said water temperature sensor.

* * * * *